United States Patent Office 3,074,963
Patented Jan. 22, 1963

3,074,963
DERIVATIVES OF p-[COUMARINYL-(3)]-PHENYL-CARBAMIC ACID
Edgar Siegel and Anton Schlachter, Leverkusen, Germany, assignors to Farbenfabriken Bayer Aktiengesellschaft, Leverkusen, Germany, a corporation of Germany
No Drawing. Filed Dec. 14, 1959, Ser. No. 859,091
Claims priority, application Germany Dec. 17, 1958
10 Claims. (Cl. 260—343.2)

The present invention relates to derivatives of p-[coumarinyl-(3)]-phenyl carbamic acid; more particularly it concerns derivatives of p-[coumarinyl-(3)]-phenyl carbamic acid based on the general formula

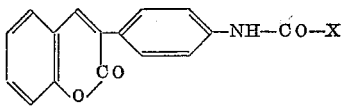

wherein X stands for the radical OR or

R denotes an alkyl radical, e.g., the methyl or ethyl radical, an aralkyl radical, e.g., the benzyl radical, or an aryl radical, e.g., the phenyl radical; the radical R may also be substituted by halogen, alkoxy or dialkylamino groups, for example. $R_1$ and $R_2$ denote independent of one another hydrogen or one of the radicals indicated for R; insofar as the radicals $R_1$ and $R_2$ are not hydrogen, they may also be substituted by halogen, hydroxy, alkoxy or sulphonic acid groups, for example. The derivatives of p-[coumarinyl-(3)]-phenyl carbamic acid may be further substituted in the coumarinyl-phenyl radical by halogen, alkyl, cyano, alkylsulphone, sulphonamide, carboxy or sulphonic acid groups, for example.

As derivatives of p-[coumarinyl-(3)]-phenyl carbamic acid according to the present invention the following compounds may be mentioned, for example,

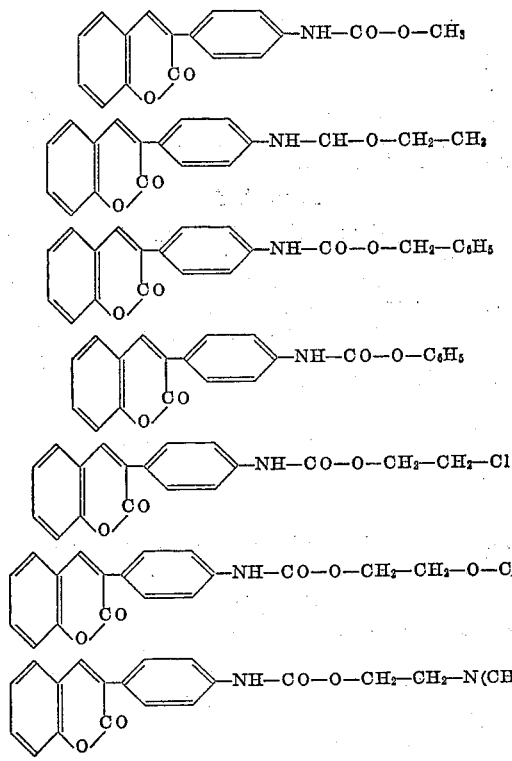

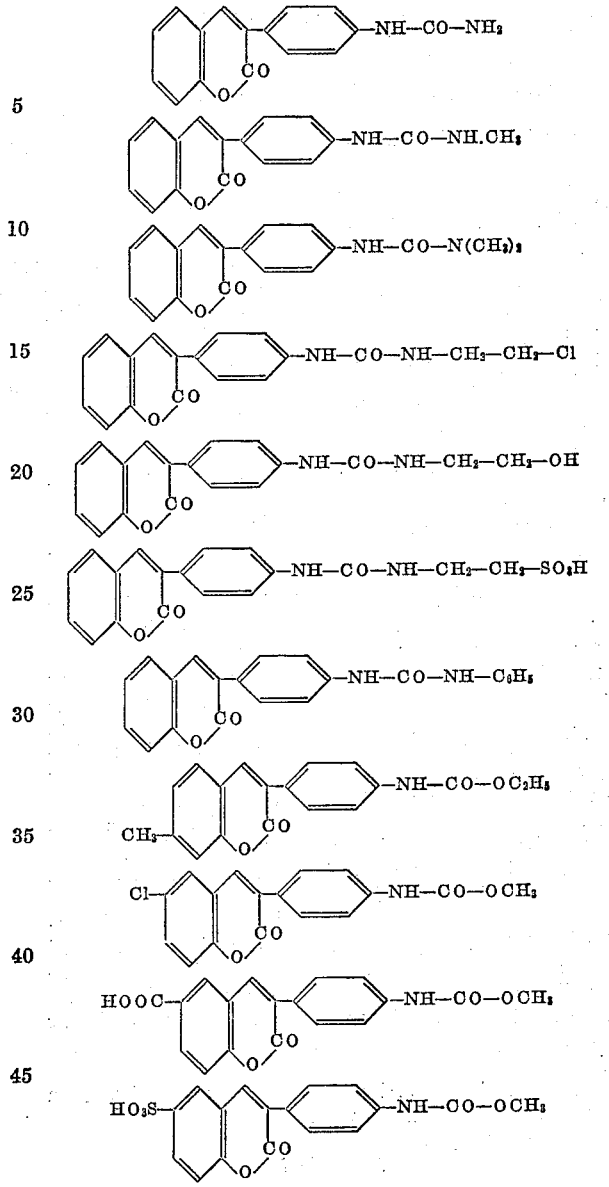

The derivatives of p-[coumarinyl-(3)]-phenyl carbamic acid are obtainable in various ways by, for example, reacting 3-(p-aminophenyl)-coumarin or derivatives thereof with the chloroformic acid esters of alcohols or phenols corresponding to the substituent R, by reacting 3-(p-aminophenyl)-coumarin or derivatives thereof with pyrocarbonic acid esters of alcohols on which the substituent R is based, or by the action of p-[coumarinyl-(3)]-phenyl-isocyanate or derivatives thereof upon alcohols or phenols on which the substituent R is based, or upon amines of the general formula $$NH \begin{matrix} R_1 \\ R_2 \end{matrix}$$

The 3-(p-aminophenyl)-coumarins required as starting materials may be obtained by reduction of the corresponding 3-(p-nitrophenyl)-coumarins which themselves are obtainable by condensation of p-nitrophenyl-acetonitrile with o-hydroxybenzaldehyde or derivatives thereof and subsequent cyclization in glacial acetic acid or by coupling of coumarin or derivatives thereof with diazotised p-nitraniline.

The derivatives of p-[coumarinyl-(3)]-phenyl carbamic acid of the present invention are useful for various applications. In particular they can be used as optical brightening agents, for example, in the form of solutions in water or organic solvents, in the form of aqueous dispersion or in combination with detergents; they may also be added to spinning or pouring masses serving for the production of synthetic fibres, filaments, foils or other articles.

In order to brighten the spinning and pouring masses serving for the production of artificial fibres and plastics there may also be added compounds which are capable of forming the derivatives of p-[coumarinyl-(3)]-phenyl carbamic acid according to the invention during or subsequent to the production of the fibres or plastics, for example a p-[coumarinyl-(3)]-phenyl isocyanate in combination with alcohols, e.g. glycerol or polyvinyl alcohol, or in combination with amines such as alkanol amines or polyalkylene polyamines; the isocyanate may also be used for this purpose in the form of compounds splitting off isocyanate as are obtainable, for example, by the addition of phenols or compounds containing reactive methylene groups.

During the production of the fibres or plastics or subsequent to the production of fibres or plastics, the formation of the derivatives of p-[coumarinyl-(3)]-phenyl carbamic acid according to the invention is then effected in the material itself by heating to an elevated temperature. If for the synthesis of the synthetic fibres or plastics there are used alcohols, e.g. glycols for the synthesis of polyester fibres, or amines, e.g. diamines for the synthesis of polyamide fibres, it is frequently sufficient to add to the material to be brightened merely a p-[coumarinyl-(3)]-phenyl isocyanate, optionally in the form of a compound splitting off isocyanate; upon heating the material the isocyanate then reacts with the alcohol or amine used for the synthesis of the material with the formation of a derivative of p-[coumarinyl-(3)]-phenyl carbamic acid. The derivatives some of which are thus chemically bound to the artificial fibres or plastics impart to the material an especially stable whitening effect.

It is already known to use as brightening agents derivatives of 3-(p-aminophenyl)-coumarin which are acylated in the amino group by alkoxy-substituted aromatic carboxylic acids. Compared with these brightening agents, the derivatives of p-[coumarinyl-(3)]-phenyl carbamic acid of the present invention are distinguished by greater efficiency.

The following examples serve to illustrate the invention without, however, limiting the scope thereof; the parts given are by weight.

*Example 1*

23.7 parts of 3-(p-aminophenyl)-coumarin of melting point 190–192° C. are dissolved at room temperature in 120 parts of dry pyridine and the solution is then treated dropwise at 10° C. with 35 parts of chloroformic acid methyl ester. The mixture is stirred at room temperature for 2 hours, 150–200 parts of water are then added and the crystallised product is filtered off with suction, washed with water and dried at 100° C. The resultant pale yellowish methyl ester of p-[coumarinyl-(3)]-phenyl carbamic acid of the formula

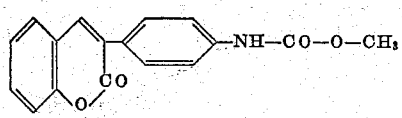

has a melting point of 152–154° C.

*Example 2*

The same procedure is followed as described in Example 1, but instead of 35 parts of chloroformic acid methyl ester, an equal quantity of chloroformic acid phenyl ester is used. The phenyl ester of p-[coumarinyl-(3)]-phenyl carbamic acid of the formula

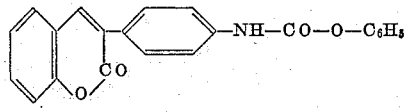

is then obtained which melts between 197 and 218°.

*Example 3*

23.7 parts of 3-(p-aminophenyl)-coumarin are dissolved in 100 parts of hot dioxane and the solution is then treated dropwise at 80° C. with 25 parts of pyrocarbonic acid diethyl ester. The reaction mixture is subsequently stirred at 80–90° C. for a further 30 minutes. Upon cooling of the solution, the ethyl ester of p-[coumarinyl-(3)]-phenyl carbamic acid of the formula

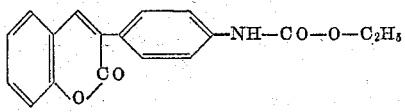

crystallises out in the form of pale yellowish coarse crystals which are filtered off with suction, washed with alcohol and dried at 100° C. The ethyl ester has a melting point of 181–182° C.

*Example 4*

75 parts of p-[coumarinyl-(3)]-phenyl isocyanate (melting point 210–230° C. with decomposiiton) are boiled under reflux for 2 hours with 150 parts of glycolmonomethyl ether. The solution which becomes clear in the course of the reaction proceeding with vigorous evolution of heat, is cooled. The product which crystallises out is rubbed with cold methanol, sharply filtered off with suction and recrystallised from 600 parts of methanol. The β-methoxyethyl ester of p-(3-coumarinyl)-phenyl carbamic acid of the formula

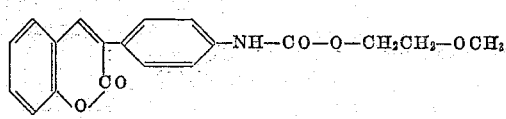

is thus obtained in the form of lustrous prisms which melt at 130° C.

By using an equal quantity of ethylene chlorohydrin instead of the 150 parts of glycolmonomethyl ether and otherwise operating in the manner as indicated in the preceding paragraph, the β-chlorethyl ester of p-[coumarinyl-(3)]-phenyl carbamic acid is obtained which has a melting point of 189° C.

*Example 5*

26.3 parts of p-[coumarinyl-(3)]-phenyl isocyanate and 50 parts of β-dimethylamino ethanol are boiled under reflux for two hours; the reaction mixture is then diluted with 250 parts of water and the product which crystallises out filtered off with suction, washed and dried. The β-dimethylamino-ethyl ester of p-[coumarinyl-(3)]-phenyl carbamic acid of the formula

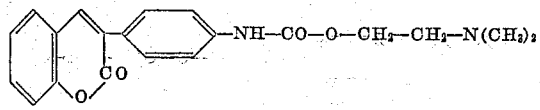

is obtained in the form of a pale yellow powder of melting point 114° C. (with decomposition).

*Example 6*

26.3 parts of p-[coumarinyl-(3)]-phenyl isocyanate are dissolved in 250 parts of hot nitrobenzene and the solution is treated at 120° C. while stirring with a mixture of 6.5 parts of ethanol amine and 25 parts of nitrobenzene added in one portion.

After cooling of the solution, the pale yellow reaction product of the formula

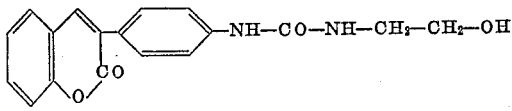

crystallising out is filtered off with suction, washed with benzene and dried at 100° C. The product has a melting point of 214° C.

*Example 7*

26.3 parts of finely powdered p-[coumarinyl-(3)]-phenyl isocyanate are stirred at room temperature for 24 hours in 83 parts of a 22% aqueous solution of sodium β-aminoethane-sulfonate treated with a wetting agent. Another 55 parts of a 22% aqueous solution of sodium β-amino-ethane sulfonate are then added to the thickly liquid suspension, and the mixture is further stirred at room temperature for 24 hours. The suspension is then made up to 700 parts with water and heated to the boil. The small quantity of impurities is filtered from the hot, nearly clear solution obtained which is adjusted to a pH value of 2–3 by the addition of concentrated hydrochloric acid, and treated with 350 parts of a hot saturated common salt solution. The solution is cooled with stirring and the separated pale yellow reaction product of the formula

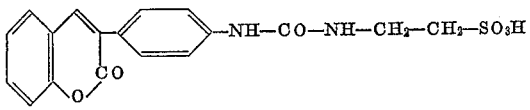

is filtered off with suction, sharply squeezed and dried; after the addition of a little sodium carbonate, it dissolves clearly in water.

*Example 8*

In 750 parts of dimethyl formamide are first dissolved 0.25 part of the product obtained according to Example 1 and subsequently 250 parts of polyacrylonitrile of K-value 90 with heating and stirring. The solution is spun in conventional manner according to the dry spinning process so that the filaments, after being stretched in boiling water by 300%, have a titre of about 3 denier. The filaments are subsequently moved about at 95° C. for one hour in a bath having a goods-to-liquor ratio of 1:30 and containing per litre 2 g. of sodium chlorite and 2 g. of oxalic acid, and then rinsed and dried. The polyacrylonitrile filaments show a pure white which is very stable to light.

*Example 9*

A solution of 0.1 part of the product obtained according to Example 2 in 1 part of dioxane is poured into a cold solution of 1 part of a mixture consisting of a fatty alcohol sulfonate and a fatty alcohol polyglycol ether in 1000 parts of water. After the dispersion thus obtained is adjusted to a pH of 3.5 by means of acetic acid, a yarn of polyacrylonitrile fibres is introduced into the dispersion the goods-to-liquor ratio being 1:40; the bath is then heated to boiling temperature within 20 minutes and kept at this temperature for a further 30 minutes. The yarn is subsequently rinsed and dried; it then shows a very good brightening effect.

*Example 10*

A solution of 0.035 part of the product obtained according to Example 3 in 1 part of dioxane is poured into a cold solution of 1 part of a mixture consisting of a fatty alcohol sulfonate and a fatty alcohol polyglycol ether in 1000 parts of water. Into the resultant cold aqueous dispersion of the product fibres or fabric of cellulose acetate are introduced, the goods-to-liquor ratio being 1:30, the bath is heated to 60° C. within 10 minutes and kept at this temperature for a further 20 minutes. After rinsing and drying, the textile material shows an outstanding brightening effect which is very stable to light.

*Example 11*

A solution of 0.025 part of one of the products obtained according to Example 4 in 1 part of dioxane is poured into a cold solution of 1 part of a mixture consisting of a fatty alcohol sulfonate and a fatty alcohol polyglycol ether in 1000 parts of water. Into the resultant cold aqueous dispersion fibres or fabrics of polyamides are introduced, the goods-to-liquor ratio being 1:40, the bath is then heated to the boil within 15 minutes and kept at this temperature for a further 30 minutes. After rinsing and drying, the polyamide fibre material shows an excellent brightening effect which is very fast to light.

*Example 12*

0.075 part of the product obtained according to Example 5 are pasted with 0.1 part of glacial acetic acid and 1000 parts of hot water are then poured into the paste; the solution thus obtained is treated with 0.75 part of 30% acetic acid and cooled. A yarn of poly-acrylonitrile fibres is then introduced into the solution having a goods-to-liquor ratio of 1:40, the bath is heated to boiling temperature within 20 minutes and kept at this temperature for 30 minutes. After rinsing and drying, the yarn shows a very good brightening effect which is very fast to light.

*Example 13*

A solution of 0.035 part of the product of Example 6 in dioxane is poured into a cold solution of 1 part of a mixture consisting of a fatty alcohol sulfonate and a fatty alcohol polyglycol ether in 1000 parts of water. Into the resultant cold aqueous dispersion fibres or fabrics of cellulose acetate are then introduced, the goods-to-liquor ratio being 1:30, the bath is heated to 60° C. within 10 minutes and kept at this temperature for 20 minutes. After rinsing and drying, the acetate rayon shows an excellent brightening effect which is very fast to light.

*Example 14*

0.025 part of the product obtained according to Example 7 are dissolved in 1000 parts of water and the solution is adjusted to a pH value of 4 by the addition of acetic acid. Fibres or fabrics of polyamides are then introduced into the bath having a goods-to-liquor ratio of 1:40, the bath is heated to the boil within 15 minutes and kept at this temperature for 30 minutes. After rinsing and drying, the polyamide material shows a strong brightening which is very fast to light.

We claim:
1. A compound of the formula

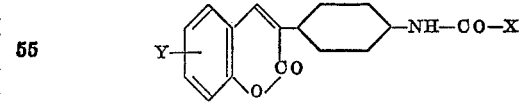

wherein X stands for a radical selected from the group consisting of —O-lower alkyl, —O-phenyl, —O-lower alkoxy lower alkyl, —$NH_2$, —NH lower alkyl, —N(lower alkyl)$_2$, —NH(lower hydroxyalkyl), —O-$CH_2CH_2$N($CH_3$)$_2$
—NH—$CH_2CH_2SO_3$H
—O-benzyl
—O-$CH_2CH_2$Cl
—NH—$CH_2CH_2$Cl
—NH-phenyl and Y stands for a radical selected from the group consisting of methyl, chloro, COOH and $SO_3$H.

2. A compound of claim 1 wherein X stands for —O-lower alkyl and Y stands for hydrogen.

3. A compound of claim 1 wherein X stands for O-phenyl and Y stands for hydrogen.

4. A compound of claim 1 wherein X stands for O-lower alkoxy lower alkyl and Y stands for hydrogen.

5. A compound of claim 1 wherein X stands for NH₂ and Y stands for hydrogen.

6. A compound of claim 1 wherein X stands for NH-lower alkyl and Y stands for hydrogen.

7. A compound of claim 1 wherein X stands for N(lower alkyl)₂ and Y stands for hydrogen.

8. A compound of claim 1 wherein X stands for NH-lower hydroxyalkyl and Y stands for hydrogen.

9. A compound having the formula

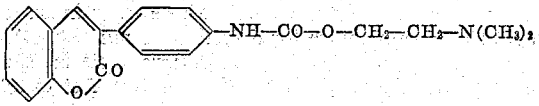

10. A compound having the formula

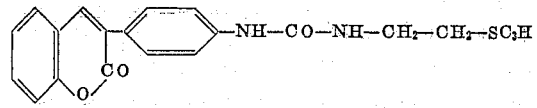

References Cited in the file of this patent

UNITED STATES PATENTS 2,702,296    Sartori _____ Feb. 15, 1955